(12) United States Patent
Bredin

(10) Patent No.: US 6,516,369 B1
(45) Date of Patent: Feb. 4, 2003

(54) FAIR AND HIGH SPEED ARBITRATION SYSTEM BASED ON ROTATIVE AND WEIGHTED PRIORITY MONITORING

(75) Inventor: Francis G. Bredin, Maisons Alfort (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,496

(22) Filed: Dec. 28, 1999

(30) Foreign Application Priority Data

Dec. 29, 1998 (EP) .............................................. 98480095

(51) Int. Cl.[7] .......................................... G06F 13/364
(52) U.S. Cl. ...................................... 710/111; 370/448
(58) Field of Search ................. 710/111–125, 240–244; 370/447, 448, 461, 462

(56) References Cited

U.S. PATENT DOCUMENTS

| | | | | |
|---|---|---|---|---|
| 5,519,837 A | * | 5/1996 | Tran | 370/462 |
| 5,526,496 A | * | 6/1996 | Alnuweiri | 710/125 |
| 5,745,708 A | * | 4/1998 | Weppler et al. | 340/825.5 |
| 6,032,218 A | * | 2/2000 | Lewin et al. | 710/111 |
| 6,199,124 B1 | * | 3/2001 | Ramakrishnan et al. | 710/22 |
| 6,653,618 | * | 3/2002 | Hung et al. | 370/235 |
| 6,420,901 B2 | * | 7/2002 | Liu et al. | 326/38 |

* cited by examiner

*Primary Examiner*—Paul R. Myers
(74) *Attorney, Agent, or Firm*—Kevin M. Jordan; Anne Vachon Dougherty

(57) ABSTRACT

A mixed rotative and weighted arbiter for arbitrating the priority of request signals R1–Rn supplied from a plurality of devices is disclosed. The arbiter is composed of a token circuit which delivers a token vector having one position set active. The token vector as well as the plurality of request signals are input to a rotative arbitration circuit. The rotative arbitration circuit processes a round robin algorithm to output a rotative request vector having input requests ordered from a higher to a lower priority configuration according to the active position of the token vector. The arbiter further comprises a weighted arbitration circuit connected to the output of the rotative arbitration circuit for generating a weighted request vector determining a linear priority configuration of the rotative request vector. A grant generation circuit is connected to the output of the weighted arbitration circuit and to the output of the token circuit to deliver a grant order to the device which may gain access to the bus and a plurality of no grant orders to the others devices.

21 Claims, 7 Drawing Sheets

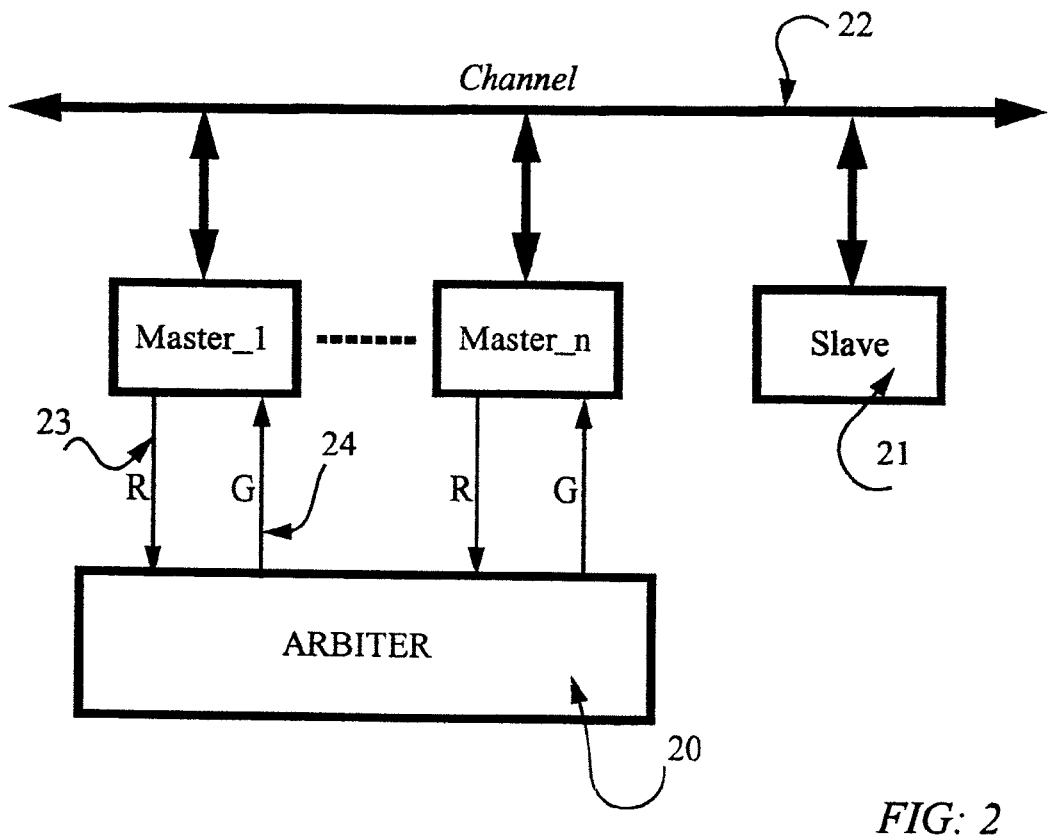
FIG: 2
*An N-bit shift register can be used to store the token vector. Only 1 token bit is ON at any time.*
Wrap around shift
FIG: 3

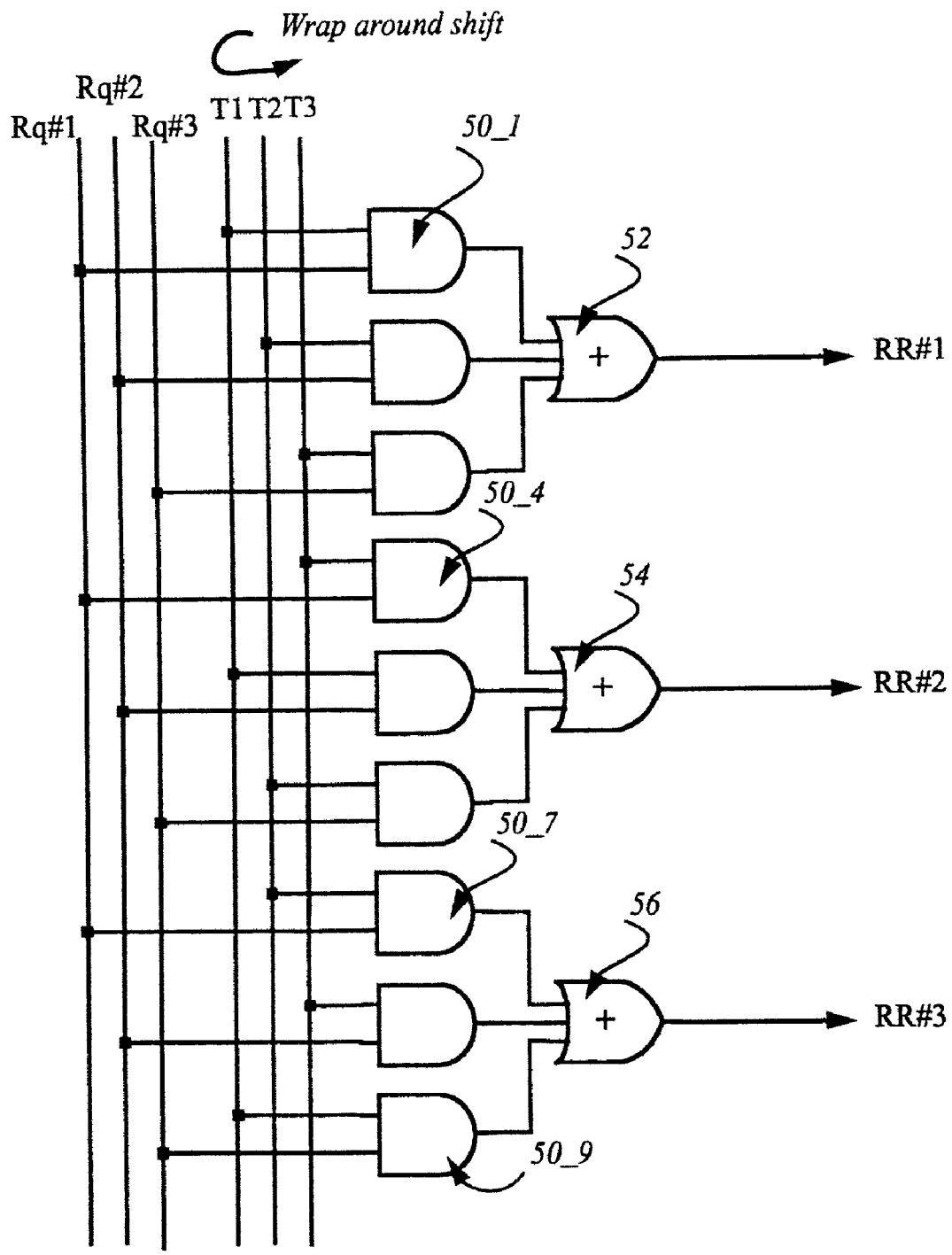
FIG: 5

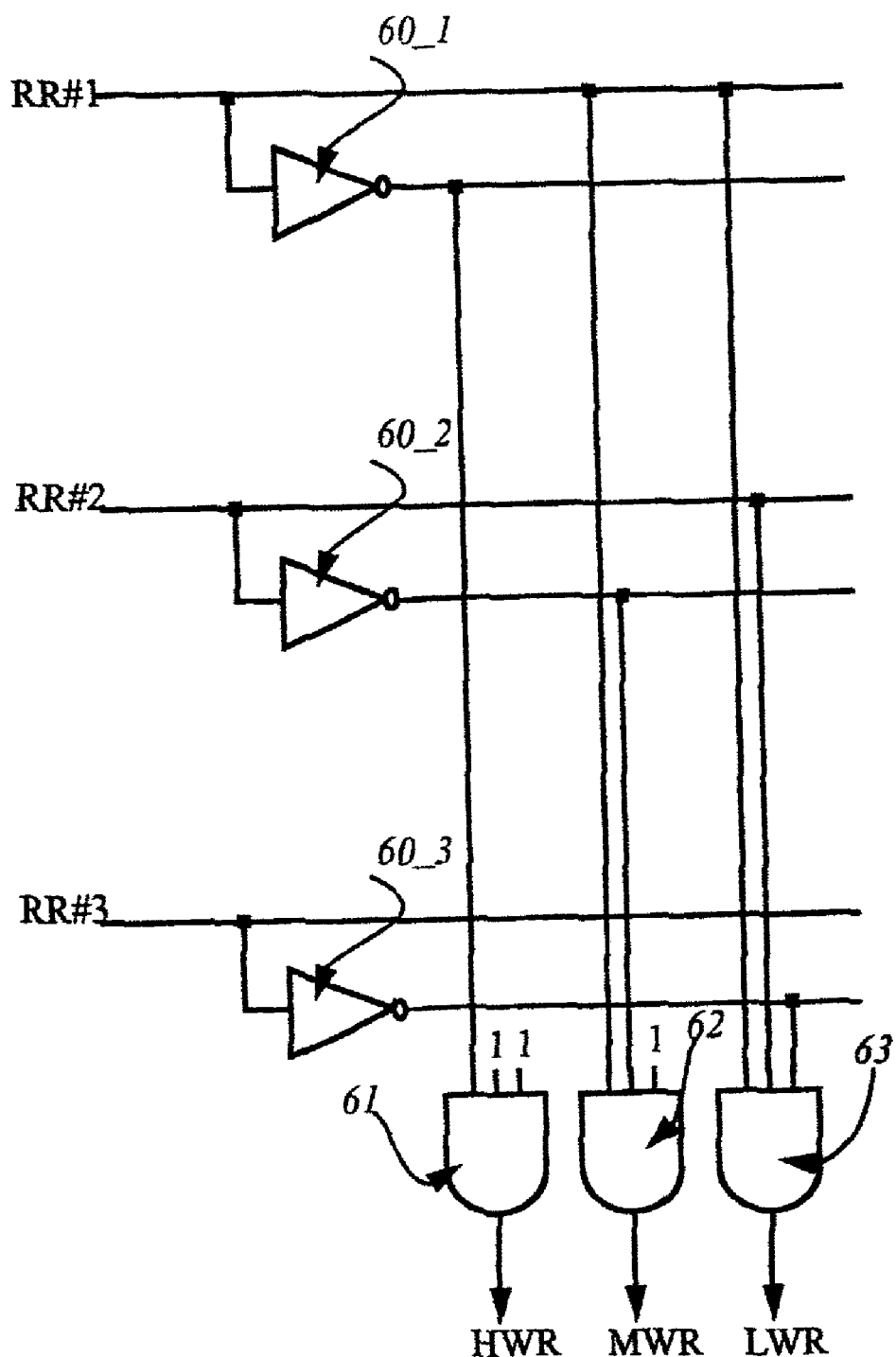
FIG: 6

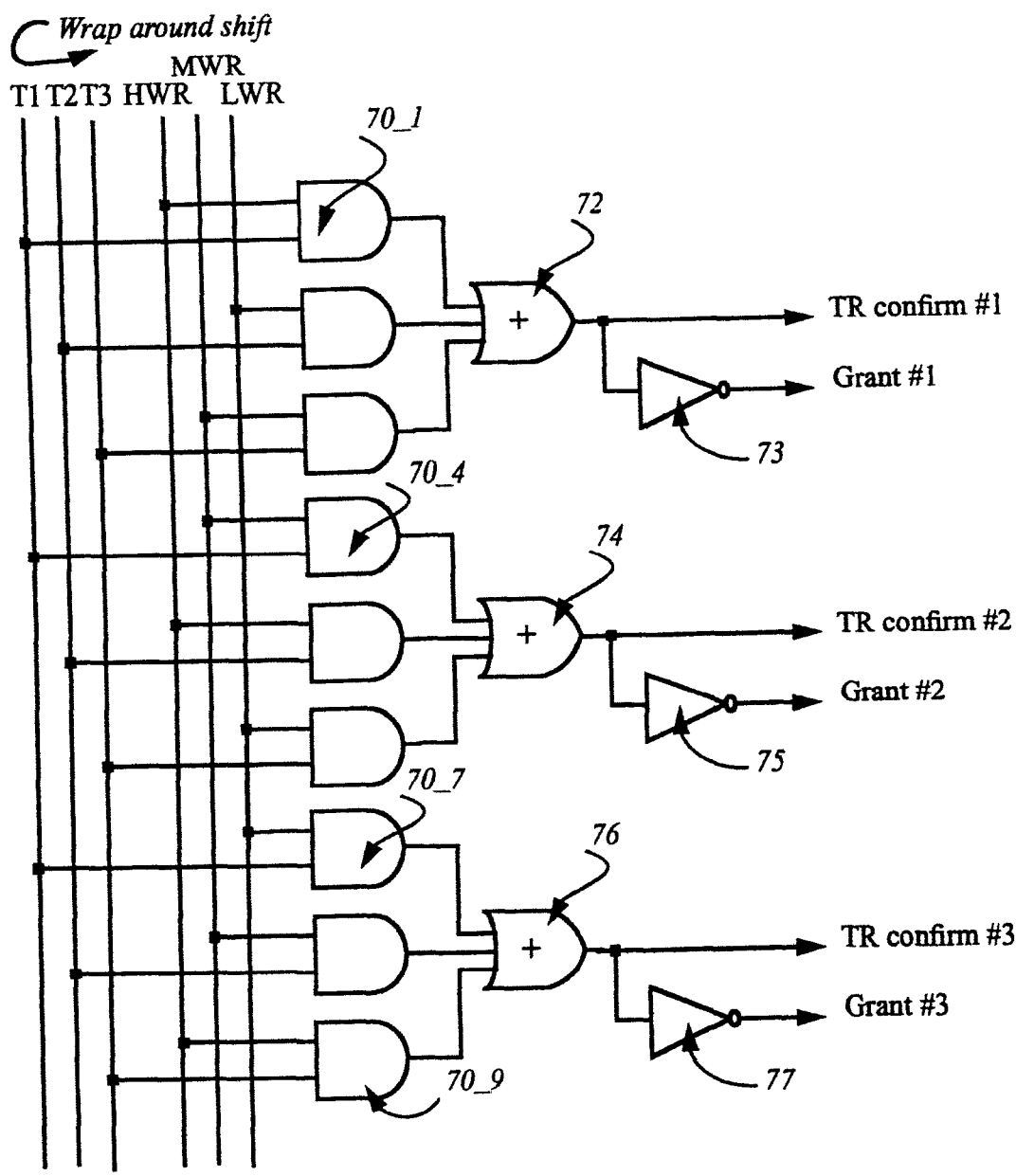
FIG: 7

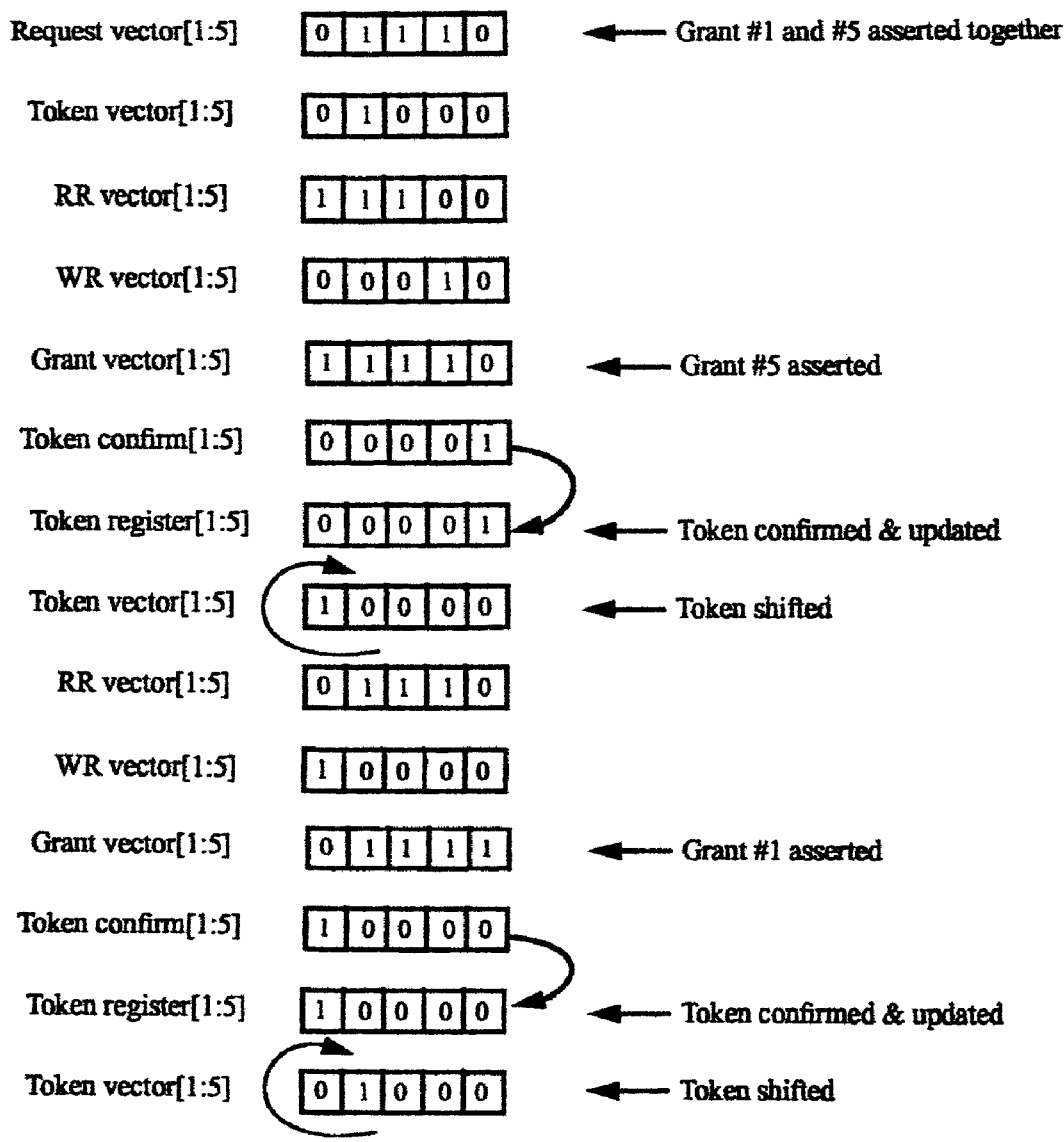
FIG: 8

FAIR AND HIGH SPEED ARBITRATION SYSTEM BASED ON ROTATIVE AND WEIGHTED PRIORITY MONITORING

FIELD OF THE INVENTION

The present invention relates to arbitration in computer systems. More particularly the invention is directed to an arbitration system and method based on a dual rotative and weighted priority scheme for arbitrating access of shared resources to a common bus.

BACKGROUND OF THE INVENTION

In high speed telecommunication networks wherein a plurality of resources share a common bus, arbitration of the requests to access the bus is a critical operation that must insure fairness and be accomplished in a minimum time cycle. Mainly two types of arbiters have been implemented to reach both or either one of these goals. In a first type, which is generally called a linear arbitration, a fixed priority value is associated to each resource and the highest priority requester may prevent access to the bus by the lower priority requesters until it has relinquished control of the bus. This technique suffers the drawback of being unfair. The other general type of arbitration system allows that each requesting device may gain access to the bus in an equitable manner. Several circuit architectures allow this fairness priority arbitration. In the round robin design, the arbiter scans through the input devices as long as an active requester is reached. The time arbitration increases directly with the number of input devices. Moreover, once an active requester is reached, a weighted priority value is computed for it and thus the fairness of the arbitration depends on the design of the priority algorithm. In case of a high number of input devices, the circuits implementation of the priority algorithm is of a large scale.

U.S. Pat. No. 5,519,837 describes a pseudo-round-robin arbiter comprising a multiplicity of arbiter cells for arbitrating among a plurality of requests. The requests are combined in various groupings and simultaneously provided to all the cells which are organized as a multiple levels hierarchy. The outputs of the higher level cells serve as enablements to successively related lower level cells in progression by level. The arbiter cells also receive inputs from respective token lines to initiate control of the grant signals. This type of hierarchical grouping allows that the time delay attributed to arbitrating requests grows logarithmically with the number of requesters; but, on the other hand, the arbitration priority is given to the group which is preliminarily selected by the token bit over the other groups, thereby leading to a less fair design than a flat arbitration scheme, wherein each input request is processed with the same priority value.

Therefore, the present invention is directed towards solving the aforementioned problems. Accordingly, it would be desirable to be able to provide a fair, compact and high speed arbiter.

It is an object of this invention to provide a fair and high speed arbitration circuit for use in connection with based bus systems.

It is another object of the invention to provide such arbiter operating with a fixed priority scheme.

Still further, it is an object of the invention to provide a method for arbitrating access of a plurality of resources to a common bus.

SUMMARY OF THE INVENTION

According to the present invention, a mixed rotative and weighted arbiter is provided. The arbiter is composed of a token circuit which delivers a token vector having one position set active. The token vector as well as a plurality of request signals supplied by requesting devices are input to a rotative arbitration circuit. The rotative arbitration circuit processes a round robin algorithm to output a rotative request vector having input requests ordered from a higher to a lower priority configuration according to the active position of the token vector. The arbiter further comprises a weighted arbitration circuit connected to the output of the rotative arbitration circuit for generating a weighted request vector determining a linear priority configuration of the rotative request vector. A grant generation circuit is connected to the output of the weighted arbitration circuit and to the output of the token circuit to deliver a grant order to the device which may gain access to the bus and a plurality of no grant orders to the others devices.

In the preferred implementation, a token confirm vector is generated simultaneously to the grant order. The token confirm vector which represents the grant/no grant orders configuration is sent to the token circuit to update the content of the cells. The active position which may be the same or a different one than for the previous token vector is shifted to the next position in order to change the priority for the next arbitration cycle.

BRIEF DESCRIPTION OF THE DRAWINGS

The invention will now be described in greater detail with specific reference to the appended drawings wherein:

FIG. 2 is a schematic diagram of an arbiter in general;

FIG. 3 shows one possible arrangement of a token vector generator;

FIG. 5 is a logical circuit of the rotative arbitration part of the arbiter of the present invention;

FIG. 6 is a logical circuit of the weighted arbitration part of the arbiter of the present invention;

FIG. 7 is a logical circuit of the aligner circuit of the present invention; and FIG. 8 shows an example of two successive arbitration cycles for a five requests vector as processed by the system of the present invention.

DETAILED DESCRIPTION OF THE INVENTION

Figure 1:
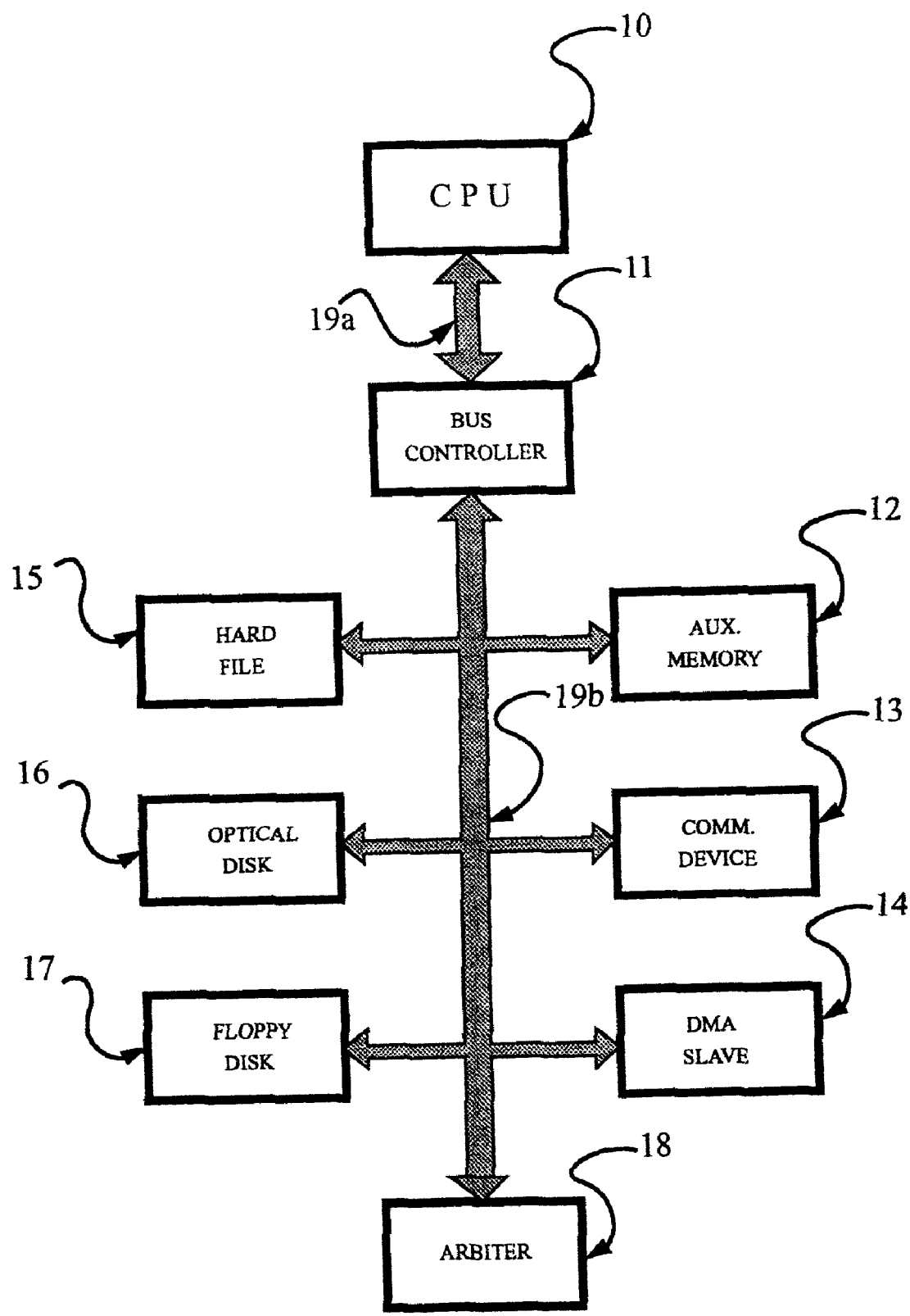
FIG. 1 is a schematic block diagram of a shared resource computer system.

FIG. 1 illustrates by schematic block diagram the preferred environment for practicing the invention. A CPU 10 communicates with a bus controller 11 via a system bus 19a. The bus controller 11 is coupled to peripheral devices (12 to 17) through a channel 19b to allow communication between the CPU and the peripheral devices. In the illustrated example, the peripheral devices include an auxiliary memory 12, communication devices 13, a hard file 15, an optical disk 16 and a floppy disk 17. Numerous other type of devices can be used to fit the system needs. Other peripheral devices are represented by DMA slave 14, but may also include devices which are bus masters.

As will be explained in more detail later, the arbitration circuit 18 processes the requests emanating from the peripheral devices of the type the bus masters to deliver a grant signal to the appropriate device for control of the channel 19b.

FIG. 2 depicts the functional relationship between the arbiter 20 and the various requesters (Master-1 to Master-n). For example, when a Master device desires access to the channel 22, a request signal R is provided to the arbiter 20 on request line 23. When the channel becomes available to accept an access, a grant signal G is returned to the requester device on grant line 24 provided the requester wins the arbitration. It is to be noted that only the Master devices may be requesters but not the devices of the type Slave as denoted by numeral 21.

FIG. 3 illustrates the concept of token vector generation as may be applicable to the arbiter of the invention. The token register delivers a n-bits token vector. By the position of the active bit (as for example bit "1" on second cell of FIG. 3) the token vector indicates which one among the n requesters is to be considered has having the highest priority over the others. In the present invention, the content of the token register is updated after each grant by a new token vector representative of the delivered grant signals. A new active position is set which may be the same as the previous one or any other one depending of the computation of the priority algorithm of the invention. Next to the updating of the token register, the active bit is shift to the next position to point to the next highest priority request.

Figure 4:
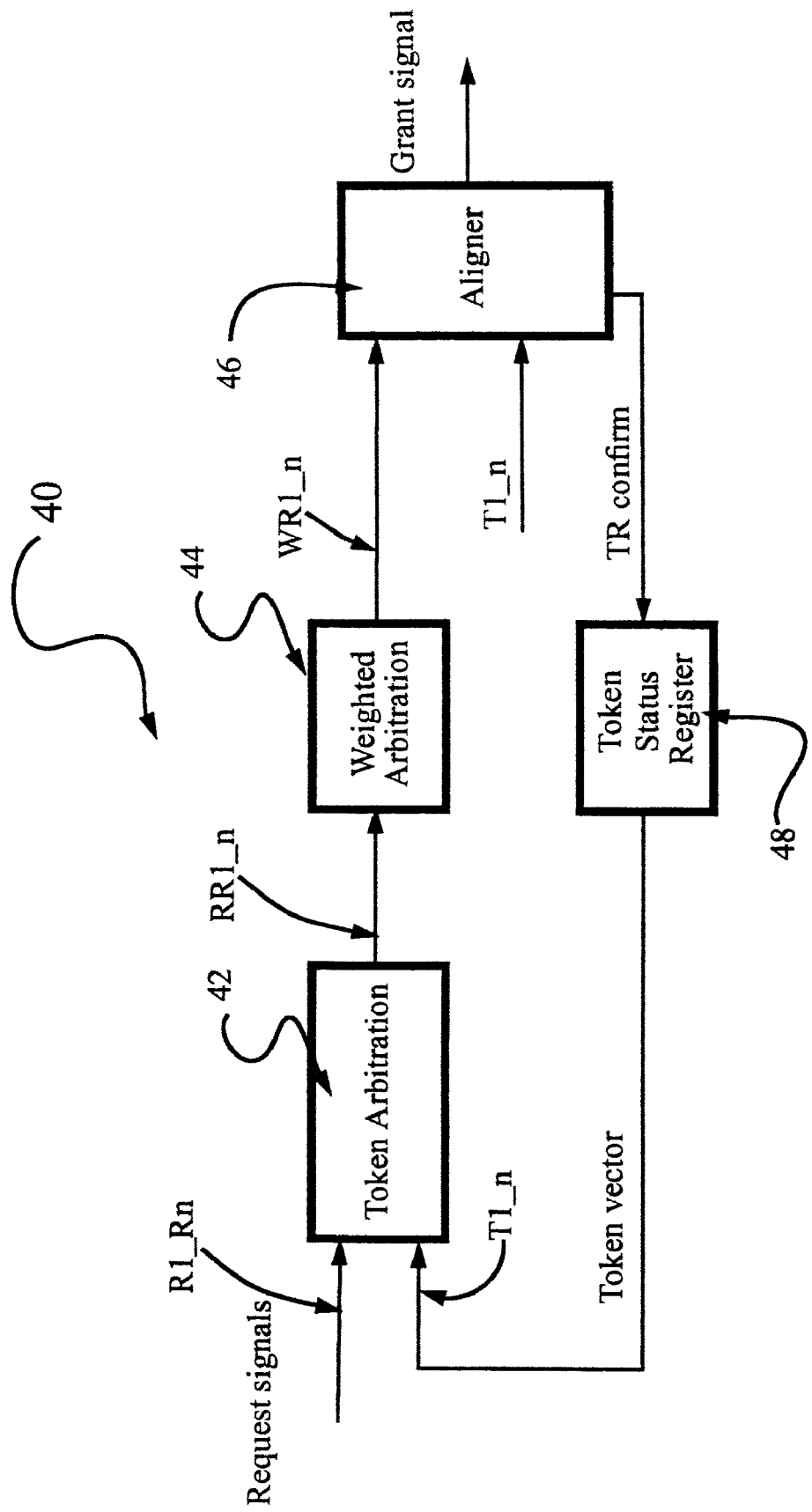
FIG. 4 is a block diagram illustrating the arbitration circuit of the present invention.

FIG. 4 depicts a block diagram setting out full details of the arbiter of the present invention. The arbiter 40 consists of four blocks: a Rotative Arbitration block 42, a Weighted Arbitration block 44, an Aligner circuit 46 and a Token Status Register 48. The rotative arbitration circuit 42 receives 'n' request signals R1–Rn and a token vector T1-n. The token vector comes from the token status register 48, and is n-bits long. A rotative request vector RR1-n is generated by the rotative arbitration circuit 42 resulting from the comparison of the request signals R1–Rn with the token vector T1-n. According to the position of the active bit in the token vector T1-n, the rotative request vector RR1-n is ordered to indicate which request device is to have the highest priority. The compare logic to be used to operate the request ordering may be as the one shown on FIG. 5 for the preferred implementation, but the skilled person will devise other logic circuits easily.

The weighted arbitration circuit 44 inputs the rotative request vector RR1-n to realise a fixed arbitration of the "n" inputs, and deliver a weighted request vector WR1-n ordered from a higher to a lower priority request. The resultant weighted request vector WR1-n is input to the aligner circuit 46. The aligner circuit also inputs the token vector T1-n to generate grant/no grant signals and a token confirm vector. The aligner circuit 46 allows that each grant/no grant signal is put in correspondence with the appropriate request device as the double phase arbitration may have reordered the initial request signals according both to the token vector configuration and to the fixed arbitration.

It has to be noted that depending on the particular protocol associated with the bus, the output of the grant generation circuit may further be connected to a bus protocol adapter to comply with the timing requirements of the bus.

As will be detailed with reference to FIG. 7, a token confirm vector is also output from the grant generation circuit 46 to be input to the token status register 48. The token confirm vector is representative of the grant/no grant signals and is addressed to the token register to update each cell for the next arbitration operation. After the updating is ended, a new cell is set active by shifting the token bit to the next position in order to prepare the next token priority order to operate the rotative arbitration circuit on the next clock cycle. The current request is then considered as having the lowest priority. An improvement of the present invention over previous arbiters is that the present invention significantly reduces the time arbitration, by updating the token register as soon after the grant generation within the current arbitration cycle in order to correctly and immediately set the token vector for the next arbitration operation.

The Token Status register may further store a selection bit F/R to operate the arbiter either in fixed priority mode or in rotative priority mode depending on the setting of the selection bit. The switching of the selection bit from the rotative mode to the fixed one allows that the new higher priority request is determined according to the position of the active bit within the token status register when the switching is done.

In another embodiment, the position of the higher priority request is coded during the initialisation procedure to permanently determine which of all the external devices will be served first during the fixed mode.

FIG. 5 illustrates the preferred implementation of logic circuits for use as the rotative arbitration of the arbiter of FIG. 4. For simplification of the description, example is made for three request signals but those skilled in the art will readily understand that the described scheme is extendible to any number of requesting devices.

The request signals are denoted Rq#1, Rq#2 and Rq#3. The token vector is 3-bits long and denoted T1, T2 and T3. Each request signal is ANDed with each token bit within AND gates 50-1 to 50-9. For example, AND gate 50-1 inputs request signal Rq#1 and token bit T1; AND gate 50-4 inputs request signal Rq#1 and token bit T3 and AND gate 50-7 inputs request signal Rq#1 and token bit T2. A similar ANDed combination of each other request signals with each token bit is also realised.

The output of AND gate 50-1 is connected to an OR gate 52 which also inputs the output of AND gate 50-2 which is the AND result of the second request signal Rq#2 with the second bit T2. AND gate 50-1 also receives the output of AND gate 50-3 which is the AND result of the third request signal Rq#3 with the third bit T3. The OR gate 52 generates a first rotative request signal RR#1. Similarly OR gate 54 generates a second rotative request signal RR#2, and Or gate 56 generates a third rotative request signal RR#3. Finally, the rotative request signals are generated following the resolution of the logic equation:

RR#1=(Rq#1*T1) OR (Rq#2*T2) OR (Rq#3*T3)

RR#2=(Rq#1*T3) OR (Rq#2*T1) OR (Rq#3*T2)

RR#3=(Rq#1*T2) OR (Rq#2*T3) OR (Rq#3*T1)

wherein '*' means a 'AND' logic combination. The general formula for a ith rotative request signal is as follows:

RR#i=(OR(for j=0 up to n−1)Rq#i*T(n−i+j)|n)

wherein 'n' is the number of input requests, and '|' means the mathematical operation 'modulo'.

FIG. 6 illustrates the preferred logical implementation for the weighted arbitration circuit of FIG. 4. The first rotative request signal (denoted RR#1 in FIG. 5) is inverted through inverter 60-1 and the inverted output is input to a first AND gate 61. The second rotative request signal RR#2 is inverted through inverter 60-2 and the inverted output is input to a second AND gate 62.

The third rotative request signal RR#3 is inverted through inverter 60-3 and the inverted output is input to a third AND gate 63. The latter also inputs the first and second rotative request signals (RR#1,RR#2), while the second AND gate 62 also inputs the first rotative request signal RR#1. Preferably all AND gates which deliver a weighted request signal are of the same type and therefore the unused inputs are permanently connected to a high level (denoted "1" on FIG. 6).

The first AND gate 61 delivers a high priority weighted request signal HWR. The second AND gate 62 delivers a medium priority weighted request signal MWR, and the third AND gate 63 delivers a low priority weighted request signal LWR.

Finally the weighted arbitration is accomplished according to the following algorithm for a n-bit rotative request vector:

Higher Priority=Complement of RR1

Second Priority=(Complement of RR2)*RR1

Medium Priority=(Complement of RRi)*RR1*RR2 . . . * RR(i-1)

Lower Priority=(Complement of RRn)*RR1*RR2 . . . * RRi . . . * RR(n-1)

wherein '*' means a AND logic combination.

Referring now to FIG. 7, a preferred logical implementation of the aligner circuit 46 of the present invention is shown. Each weighted request signal supplied from the weighted arbitration circuit 44 is ANDed with each token bit T1,T2,T3 within AND gates 70-1 to 70-9. For example AND gate 70-1 inputs the higher priority weighted request signal HWR and the token bit T1; AND gate 70-5 inputs the weighted request signal HWR and the token bit T2 and AND gate 70-9 inputs the weighted request signal HWR and the token bit T3. A similar ANDed combination of each other weighted request signals with each token bit is also realised.

The output of AND gate 70-1 is connected to a OR gate 72 which also inputs the output of AND gate 70-2 which is the AND result of the lower priority weighted request signal LWR with the second bit T2. OR gate 72 also receives the output of AND gate 70-3 which is the AND result of the medium priority weighted request signal MWR with the third bit T3. An inverter 73 is connected to the output of OR gate 72 to generate a first grant signal Gr#1. Similarly, the inverted output of OR gate 74 generates a second grant signal Gr#2, and the inverted output of Or gate 76 generates a third grant signal Gr#3. Finally, the grant signals are generated following the resolution of the logic equation:

Gr#1=(HWR*T1) OR (LWR*T2) OR (MWR*T3)

Gr#2=(MWR*T1) OR (HWR*T2) OR (LWR*T3)

Gr#3=(LWR*T1) OR (MWR*T2) OR (HWR *T3)

wherein '*' means a 'AND' logic combination. The general formula for a ith grant signal is as follows:

Gr#i=(OR (j=0 up to j=n-1)Tj*P(n-i+j)|n)

wherein 'n' is the number of input requests, 'Tj' is the token bit position, 'P' is the weighted request signal and '|' is the mathematical operation 'modulo'.

The aligner circuit also outputs a Token confirm vector TR1-n which is supplied to the token status register 48. First OR gate 72 outputs a first token confirm signal TR#1 to be stored in the first position of the token status register. The second OR gate 74 outputs a second token confirm signal TR#2 corresponding to the second position of the token status register, and the third OR gate 76 outputs a third token confirm signal TR#3 corresponding to the third position of the token status register. Each token confirm signal is addressed to the corresponding cell of the status register in order to update the content of the register for the next arbitration.

FIG. 8 shows the succession of the different vectors as generated by the preferred circuits implementation of the invention. For sake of clarity, a five bits input request vector (Rq#1 to Rq#5) is described but it is not to be interpreted as a limitation, since the process would be identical for a different number of bits of the input request vector.

On the first line the input request vector '01110' is shown having the first input request Rq#1 and the last input request Rq#5 requiring access to the bus (as indicated by '0' on the left and the right cells). On the second line, the token vector '01000' is shown as having the active position (as indicated by '1') on the second left cell. On the third line, the rotative request vector '11100' which is output from the rotative arbitration circuit is reordered according to the previously explained rotative algorithm. The rotative request vector which enters the weighted arbitration circuit is weighted and the resultant weighted request vector is ordered as follows: '00010'.

Finally as shown on the grant vector line, the fifth input request of the grant vector '11110' wins the arbitration (as indicated by '0' on the left cell). A token confirm vector '00001', which matches the complement of the grant vector, updates the content of the token register (Token register line). The token bit is then shifted to the next position (bit '1' transferred from the fifth cell to the first cell) to produce a new token vector '10000' to be used for the next cycle. On a second arbitration cycle, a new rotative request vector '01110' is generated based on the new token vector. As previously explained, a weighted request vector '10000' is generated therefrom and finally the first input request wins the arbitration (bit '0' in the first cell of grant vector '01111'). The complement token vector '10000' updates the content of the token register and the token bit is moved to the next position (bit '1' on the second cell of the last line '01000'). It is to be noted that in the chosen example the input request vector is unchanged during the two successive cycles, but the skilled person will readily understand that the arbiter of the present invention may operate with equal fairness whatever the changes in the input request vector.

While the invention has been particularly shown and described with reference to a preferred embodiment thereof, it will be understood by those skilled in the art that various change in form and details may be made without departing from the spirit and scope of the invention as set forth in the appended claims.

What is claimed is:

1. In a computer system wherein a plurality of devices request access to a common bus, an arbiter for arbitrating the priority of request signals R1–Rn supplied from the plurality of devices, the arbiter comprising:

token means for delivering a token vector T1-n having one position set active;

rotative arbitration means connected to the token means for receiving the token vector and inputting the request signals, the rotative arbitration means outputting a rotative request vector RR1-n for use in determining a round robin priority configuration based on the active position of the token vector;

weighted arbitration means connected to the output of the rotative arbitration means for generating a weighted request vector WR1-n for use in determining a linear priority configuration; and grant means connected to the output of the weighted arbitration means and to the output of the token means for delivering one of grant and no grant signals based on the outputs of the token means and the weighted arbitration means.

2. The arbiter of claim 1 further comprising means for generating a token confirm vector to update the token means, said token confirm vector being representative of the grant and no grant signals.

3. The arbiter of claim 1 further comprising means for generating a switching signal, said switching signal being supplied to the token means to fix the active position.

4. The arbiter of claim 2 further comprising means for generating a switching signal, said switching signal being supplied to the token means to fix the active position.

5. The arbiter of claim 1 further comprising a protocol adapter circuit connected to the output of the grant means to adapt the duration of the grant and no grant signals.

6. The arbiter of claim 1 further comprising a token status register comprises a plurality of register positions equal to the number of said plurality of requesting devices.

7. The arbiter of claim 1 wherein said rotative arbitration circuit comprises AND and OR logic circuitry to operate a combination of the plurality of request signals with the token vector.

8. The arbiter of claim 2 further comprising a protocol adapter circuit connected to the output of the grant means to adapt the duration of the grant and no grant signals.

9. The arbiter of claim 2 further comprising a token status register comprises a plurality of register positions equal to the number of said plurality of requesting devices.

10. The arbiter of claim 2 wherein said rotative arbitration circuit comprises AND and OR logic circuitry to operate a combination of the plurality of request signals with the token vector.

11. The arbiter of claim 4 further comprising a protocol adapter circuit connected to the output of the grant means to adapt the duration of the grant and no grant signals.

12. The arbiter of claim 4 further comprising a token status register comprises a plurality of register positions equal to the number of said plurality of requesting devices.

13. The arbiter of claim 4 wherein said rotative arbitration circuit comprises AND and OR logic circuitry to operate a combination of the plurality of request signals with the token vector.

14. The arbiter of claim 5 further comprising a token status register comprises a plurality of register positions equal to the number of said plurality of requesting devices.

15. The arbiter of claim 5 wherein said rotative arbitration circuit comprises AND and OR logic circuitry to operate a combination of the plurality of request signals with the token vector.

16. The arbiter of claim 6 wherein said rotative arbitration circuit comprises AND and OR logic circuitry to operate a combination of the plurality of request signals with the token vector.

17. In a computer system wherein a plurality of devices request access to a common bus, a method of arbitrating the priority of request signals supplied from the plurality of devices, the method comprising the steps of:

upon reception of a plurality of request signals, processing a rotative priority algorithm based on a token vector configuration, said rotative process delivering a rotative request vector having a round robin priority configuration;

upon reception of the rotative request vector, processing a weighted priority algorithm for delivering a weighted request vector having a linear priority configuration; and delivering a grant signal and a plurality of no-grant signals in response to the weighted request vector.

18. The method of claim 17 further comprising the steps of:

delivering a token confirm vector concurrently to the grant delivering step; and updating the configuration of the token vector with the configuration of the token confirm vector.

19. The method of claim 17 further comprising the step of generating a switching signal to fix the token vector configuration after the updating step.

20. The method of claim 18 further comprising the step of generating a switching signal to fix the token vector configuration after the updating step.

21. A program storage device readable by machine, tangibly embodying a program of instructions executable by the machine to perform method steps for arbitrating the priority of request signals supplied from a plurality of devices requesting access to a common bus, the method comprising the steps of:

upon reception of a plurality of request signals, processing a rotative priority algorithm based on a token vector configuration, said rotative process delivering a rotative request vector having a round robin priority configuration;

upon reception of the rotative request vector, processing a weighted priority algorithm for delivering a weighted request vector having a linear priority configuration; and delivering a grant signal and a plurality of no-grant signals in response to the weighted request vector.

* * * * *